United States Patent
Shah et al.

(10) Patent No.: US 7,055,062 B2
(45) Date of Patent: May 30, 2006

(54) METHOD, SYSTEM AND PROGRAM PRODUCT FOR ESTABLISHING A SELF-DIAGNOSING AND SELF-REPAIRING AUTOMATED SYSTEM

(75) Inventors: Rasik P. Shah, Latham, NY (US); Michael E. Kelly, Delafield, WI (US)

(73) Assignee: General Electric Company, Schenectady, NY (US)

( * ) Notice: Subject to any disclaimer, the term of this patent is extended or adjusted under 35 U.S.C. 154(b) by 638 days.

(21) Appl. No.: 10/285,658

(22) Filed: Oct. 31, 2002

(65) Prior Publication Data

US 2004/0088601 A1 May 6, 2004

(51) Int. Cl.
*G06F 11/00* (2006.01)

(52) U.S. Cl. ............................................. 714/15
(58) Field of Classification Search .................. 714/15, 714/25, 26, 37, 39, 47, 57; 701/33, 35
See application file for complete search history.

(56) References Cited

U.S. PATENT DOCUMENTS

| | | | |
|---|---|---|---|
| 5,528,516 A * | 6/1996 | Yemini et al. | 702/181 |
| 5,544,308 A * | 8/1996 | Giordano et al. | 714/26 |
| 5,577,050 A | 11/1996 | Bair et al. | 371/10.2 |
| 5,704,031 A | 12/1997 | Mikami et al. | 395/182.02 |
| 5,764,878 A | 6/1998 | Kablanian et al. | 395/182.05 |
| 6,098,032 A * | 8/2000 | Brookner | 702/182 |
| 6,115,656 A * | 9/2000 | Sudolsky | 701/35 |
| 6,178,452 B1 | 1/2001 | Miyamoto | 709/224 |
| 6,249,755 B1 * | 6/2001 | Yemini et al. | 702/183 |
| 6,434,455 B1 * | 8/2002 | Snow et al. | 701/33 |
| 6,553,507 B1 | 4/2003 | Cohen | 714/4 |
| 6,591,199 B1 * | 7/2003 | Tremblay et al. | 702/35 |
| 6,609,217 B1 * | 8/2003 | Bonissone et al. | 714/26 |
| 6,665,425 B1 * | 12/2003 | Sampath et al. | 382/112 |
| 6,782,345 B1 * | 8/2004 | Siegel et al. | 702/183 |
| 2003/0004681 A1 | 1/2003 | Fandrich et al. | 702/183 |
| 2003/0055666 A1 * | 3/2003 | Roddy et al. | 705/1 |
| 2005/0171661 A1 * | 8/2005 | Abdel-Malek et al. | 701/33 |

FOREIGN PATENT DOCUMENTS

| | | |
|---|---|---|
| EP | 0 476 680 A2 | 3/1992 |
| EP | 0 500 080 B1 | 8/1992 |
| EP | 0 593 018 A2 | 4/1994 |

(Continued)

OTHER PUBLICATIONS

Ferguson, Kevin, "PCs: What If It Breaks?", Businessweek Online: Nov. 13, 2000 Issue, http://www.businessweek.com, (Copy printed Oct. 22, 2002), 4 pages.

(Continued)

*Primary Examiner*—Nadeem Iqbal
(74) *Attorney, Agent, or Firm*—Jean K. Testa, Esq.; Kevin P. Radigan, Esq.; Heslin Rothenberg Farley & Mesiti, P.C.

(57) ABSTRACT

Method, system and program product are provided for a self-diagnose and self-repair facility for an automated machine or system. The facility monitors at least one operational parameter of the automated system, and automatically detects an abnormal status of the at least one operational parameter when present. The abnormal status is automatically evaluated to isolate a possible fault in the automated system resulting in the abnormal status, and automated repair of the possible fault is undertaken. After the automated repair, the facility determines whether the abnormal status has been eliminated.

44 Claims, 5 Drawing Sheets

FOREIGN PATENT DOCUMENTS

EP          0 810 481 A1     12/1997
WO    WO 2001/59535 A1      8/2001

OTHER PUBLICATIONS

Henderson, Peter, "IBM launches newest, biggest computer line", InfoWorld Lead With Knowledge, Dec. 14, 2000, http://staging,infoworld.com, (Copy printed Oct. 24, 2002), 2 pages.

"IBM ships biggest, baddest mainframes", Dec. 14, 2000, http://news.zdnet.co.uk, (copy printed Oct. 24, 2002), 3 pages.

* cited by examiner

METHOD, SYSTEM AND PROGRAM PRODUCT FOR ESTABLISHING A SELF-DIAGNOSING AND SELF-REPAIRING AUTOMATED SYSTEM

BACKGROUND OF THE INVENTION

The present invention relates generally to the field of system diagnosing and repair, and more particularly, to an automated method, system and computer program product for detecting an abnormal status of one or more operational parameters, evaluating the operational status to isolate a possible fault, and undertaking automated repair of the possible fault.

For certain applications, any equipment malfunction has potentially critical safety and patient health consequences, such as equipment used in the healthcare industries. Even with enhanced product designs, all of the operational service situations cannot be eliminated. When such service situations arise, the equipment may suffer down time until a repair is made.

Automated systems, such as magnetic resonance (MR) imaging systems and computer tomography (CT) imaging systems, require an operator of the system to periodically call for a field engineer to be dispatched to resolve an error or abnormal status within the automated system. Certain of these errors, such as hardware errors, do require dispatching of a field engineer.

However, recognized herein is that certain errors, such as software based errors, may be correctable without dispatching of a field engineer. Thus, a need exists in the art for an autonomous, self-diagnosing and self-repairing facility for an automated system for reducing system downtime and reducing the need for human intervention in diagnosing and repairing the system.

SUMMARY OF THE INVENTION

The present invention provides, in one aspect, a self-diagnose and self-repair method for facilitating operation of an automated system. The method includes: monitoring at least one operational parameter of the automated system; automatically detecting an abnormal status of the at least one operational parameter; automatically evaluating the abnormal status of the at least one operational parameter to isolate a possible fault resulting in the abnormal status; and undertaking automated repair of the possible fault, and thereafter automatically determining whether the abnormal status has been eliminated.

In another aspect, a self-diagnose and self-repair method for facilitating operation of an automated system is provided. This method includes: invoking from a supervisory component at least one auto-detection component for monitoring at least one operational parameter of the automated system and for communicating to the supervisory component a normal status or abnormal status condition of the at least one operational parameter; invoking by the supervisory component an auto-fault isolation component when the supervisory component receives an abnormal status condition from the at least one auto-detection component, wherein the auto-fault isolation component automatically evaluates the status of the at least one operational component to isolate a possible fault resulting in the abnormal status; and invoking from the supervisory component an auto-fix component to undertake automated repair of the possible fault, and thereafter, automatically determining whether the abnormal status has been eliminated.

System and computer program products corresponding to the above-summarized methods are also described and claimed herein. Further, other embodiments and aspects of the invention are also described in detail and claimed herein.

BRIEF DESCRIPTION OF THE DRAWINGS

The present invention may take form in various components and arrangements of components, and in various steps and arrangement of steps. The drawings presented herewith are for purposes of illustrating certain embodiments and should not be construed as limiting the invention. The subject matter which is regarded as the invention is particularly pointed out and distinctly claimed in the claims at the conclusion of the specification.

DETAILED DESCRIPTION OF THE INVENTION

Although discussed herein with reference to medical systems, such as MR systems and CT systems, the facility disclosed is applicable to the self-diagnosis and self-repair of a wide variety of automated systems. Further, the service situations susceptible to automated healing include both reactive and proactive services. The claims presented herewith are intended to encompass all such systems and situations.

The facility disclosed herein comprises an autonomous, self-diagnosing, and self-healing capability for automated systems to either completely eliminate or substantially reduce a system downtime interval resulting from a currently serviceable condition. For certain automated systems, particularly software-driven systems, there are certain operational conditions which can be monitored and self-corrected before the conditions cause system performance degradation and eventual downtime. For other fault types, which may require hardware solutions, the facility disclosed herein can carry out a first-level diagnosis to localize the fault, and inform a remote location so that the fault condition can be corrected in a minimum time during the subsequent on-site visit by a field engineer. The automated facility disclosed herein, which may be built into the automated system, can perform one or more of the following functions: automated monitoring of equipment operation; automated detection of anomalies; automated determination of anomaly type and repairability options; automated repairs of software problems; automated scheduling and execution of repairs and upgrades; and automated verification of operations after repair actions.

Figure 1:
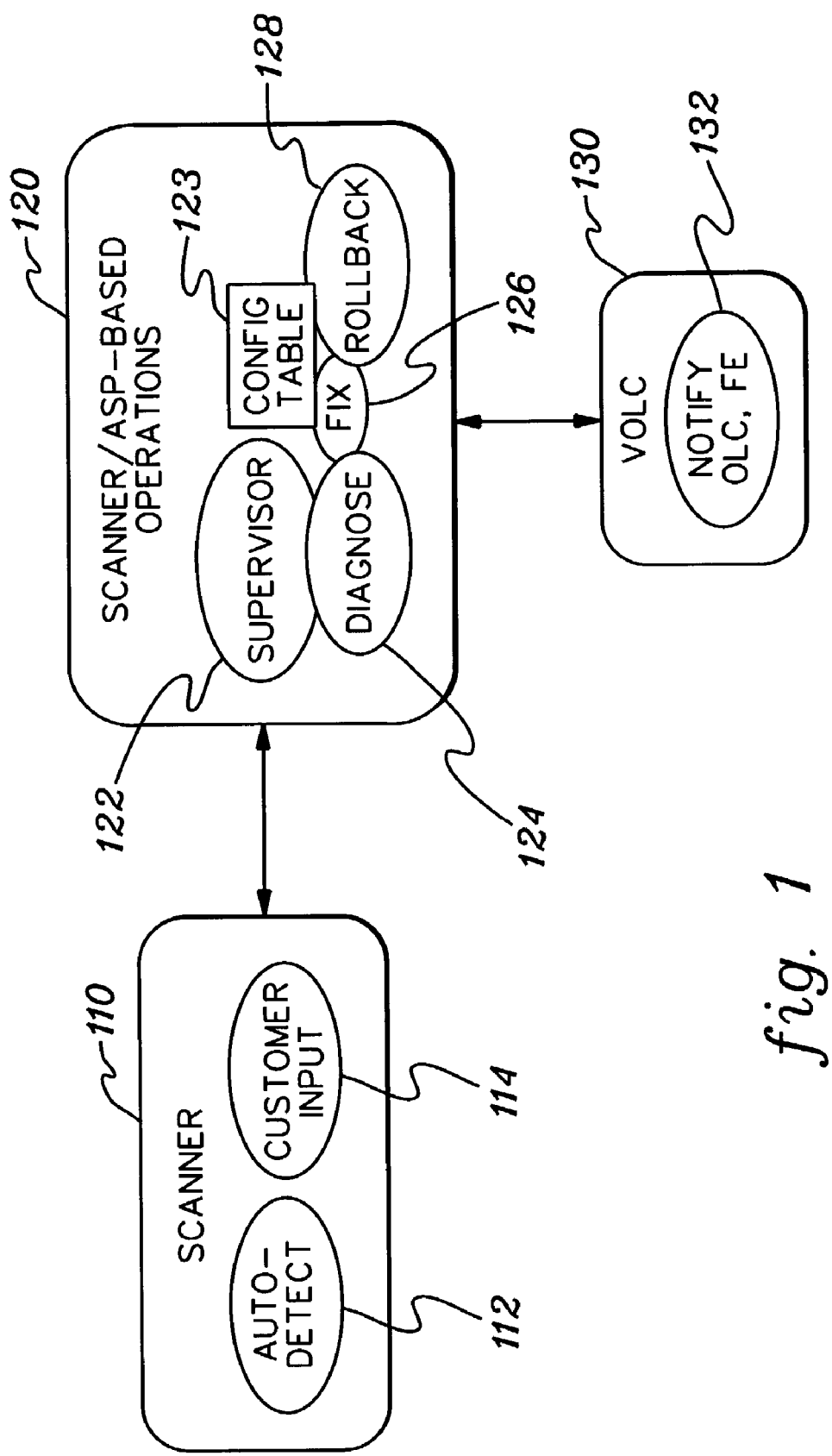
FIG. 1 is a diagrammatic illustration of one component embodiment of an automated, self-diagnosing and self-healing facility for an automated system, in accordance with an aspect of the present invention.

FIG. 1 depicts one architectural example of an automated system with a self-diagnosing and self-healing facility in accordance with an aspect of the present invention. This architecture includes a scanner 110 and application service provider (ASP) operations 120. Scanner 110 may comprise any type of automated machine or equipment, which has one or more subsystems or components, for which the self-diagnosing and self-healing facility is desired. Scanner 110 in this example includes an auto-detect component 112 and has provision for receiving customer input 114. By way of specific example, scanner 110 might comprise a magnetic resonance imaging system or a computer tomography scanning system.

Although a separate ASP is not required to achieving the goals of the present invention (i.e., the facility could be hosted within the scanner 110), hosting of certain functions of the self-diagnosing and self-healing facility on an external central entity such as an ASP 200 (see FIG. 2) reduces the need to host those functions on the automated machine itself, thereby reducing the computational load on the machine. The facility includes a supervisory component 122, a diagnose component 124, a fix component 126, and a rollback component 128, as well as a configuration table 123. The facility communicates with a virtual on-line center (VOLC) 130, which in one example, might be a central remote service center responsible for coordinating the service functions for geographically distributed automated machines (e.g., multiple scanners). During the self-healing process, the ASP operations might send a notify 132 to the on-line center for dispatching of a field engineer (FE) when an abnormal condition is the result of a failure. In this example, the field engineer is the person typically responsible for on-site repair and servicing of the automated machine.

Those skilled in the art will note that the concept architecture of FIG. 1 is a component-based architecture, and in this example, the ASP holds certain proprietary knowledge (as disclosed herein), and allows simpler knowledge maintenance, in accordance with aspects of the present invention. The various functions shown in the concept architecture of FIG. 1 can be executed by four software modules or components, entitled the Supervisory Component, Auto-Detection Component, AutoFault Isolation Component, and Auto-Fix Component. By way of example, these components may have the functions set forth below.

Supervisory Component:
  Decides which local self-healing facility component to invoke and when.
  Receives data from auto-detection components, interprets data, invokes auto-fault isolation component, determines that a fault can be repaired in real time, invokes auto-fix component to execute repair and repair verification steps, conducts state rollback if appropriate, and logs all appropriate entries.
  Communicates to a central remote service center any certain fault situations, e.g., involving hardware repairs.
  Communicates with a central remote service center for enterprise-level inputs and decisions.

Auto-Detection Component(s):
  Each auto-detection component may be assigned to monitor a particular subsystem or feature of the automated machine.
  Normally dormant; and invoked by the supervisory component when needed.
  When invoked to run, communicates normal/abnormal status of predefined parameters to supervisory component; frequency of communication specified by the supervisory component.

Auto-Fault Isolation Component(s):
  Normally dormant; invoked by supervisory component when it receives "abnormal status" condition(s) from the auto-detection component(s).
  Upon invocation, conducts analysis of abnormal parameters to isolate fault and the degree of confidence in fault isolation.

Auto-Fix Component:
  Normally dormant; invoked by supervisory component when it receives high-confidence fault isolation results from auto-fault isolation component(s).
  Ensures that the repair steps and estimated repair duration are available.
  Notifies machine operator and solicits scheduled time for executing repair steps.
  Executes repair steps at scheduled time.
  Verifies repair; rolls back to previous state if repair is unsuccessful.
  Notifies machine operator and supervisory component upon successful/unsuccessful repair.

Figure 2:
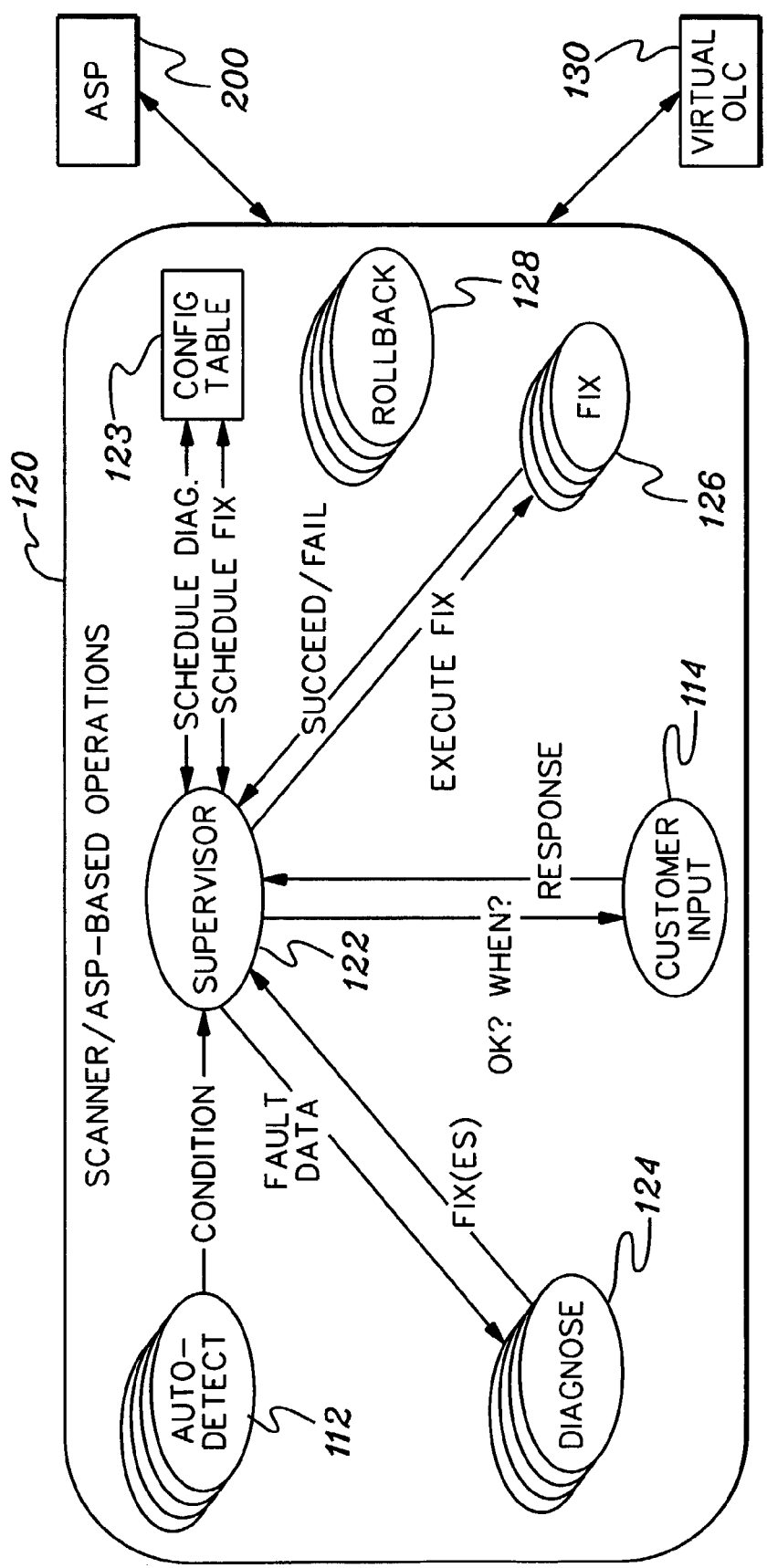
FIG. 2 is an expanded diagrammatic illustration of one embodiment of application-service provider (ASP) based operations for the automated self-diagnosing and self-healing facility of FIG. 1, in accordance with an aspect of the present invention.

FIG. 2 depicts the sequence of events and nature of communication between a scanner, ASP and virtual on-line center in one example of a facility in accordance with an aspect of the present invention. Note that the "configuration table" is provided as a convenience aid for scheduling events. As shown in the figure, auto-detection component 112 detects a normal and/or an abnormal condition which is forwarded to the supervisory component 122. Supervisory component 122 schedules diagnosis of any abnormal condition using configuration table 123. The fault data is forwarded from the supervisory component 122 to one or more diagnose components 124. Diagnose components 124 return one or more possible fixes to supervisory component 122. Supervisory component 122 then requests customer input 114, for example, from an operator of the automated system. Component 122 communicates to the operator that an abnormal condition has been detected and a possible fix identified. The customer's input 114 is a response back to the supervisory component 122, which uses the input in order to schedule a fix of the abnormal condition using the configuration table 123. The supervisory component 122 executes a fix using one or more fix components 126. Fix components 126 return a succeed/fail indication to the supervisory component upon automated repair of the possible fault, and the supervisory component automatically determines whether the abnormal status (or condition) has been eliminated.

Figure 3A:
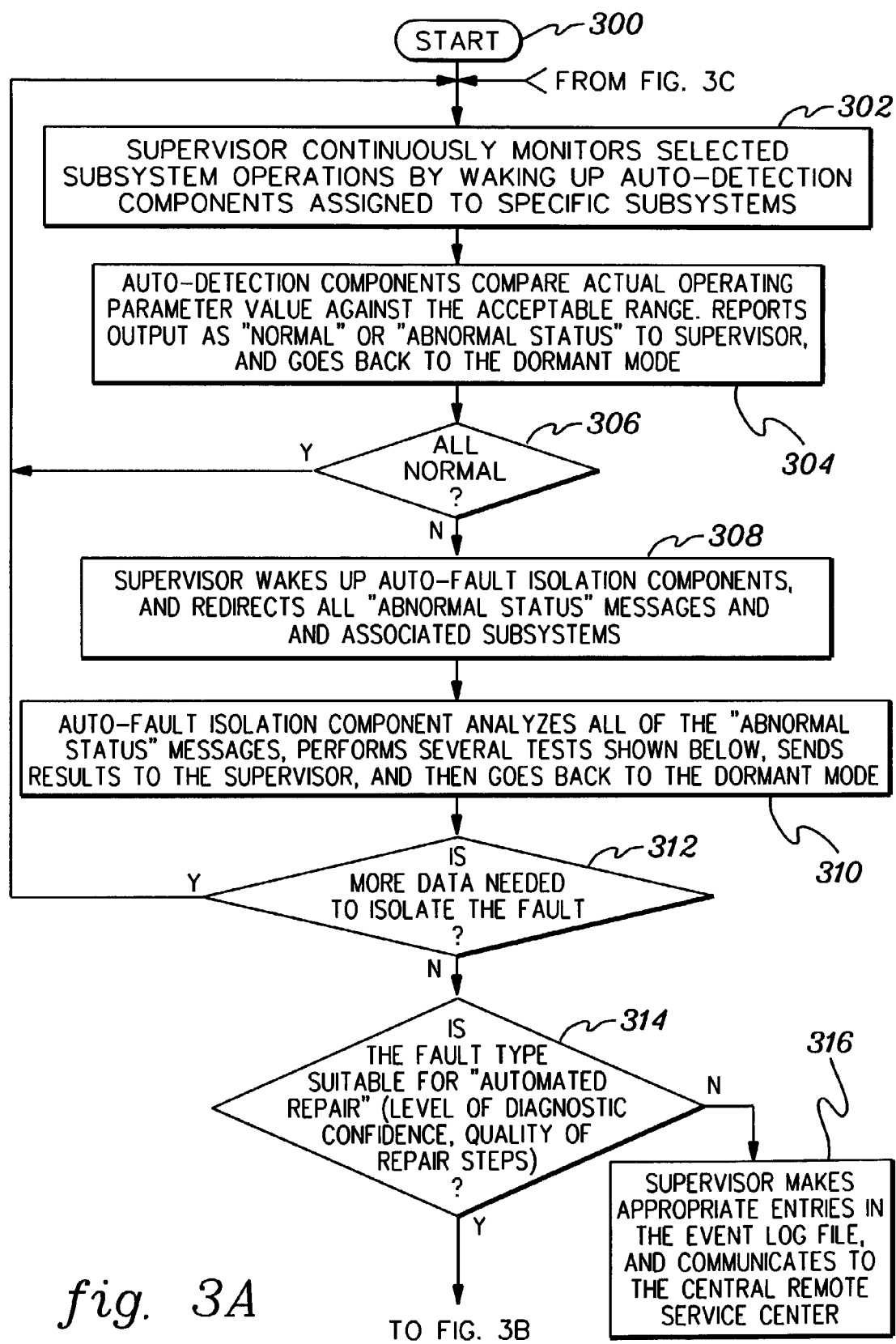
FIGS. 3A, 3B & 3C are a flowchart of one processing embodiment of an automated self-diagnosing and self-healing facility for an automated system, in accordance with an aspect of the present invention.
Figure 3B:
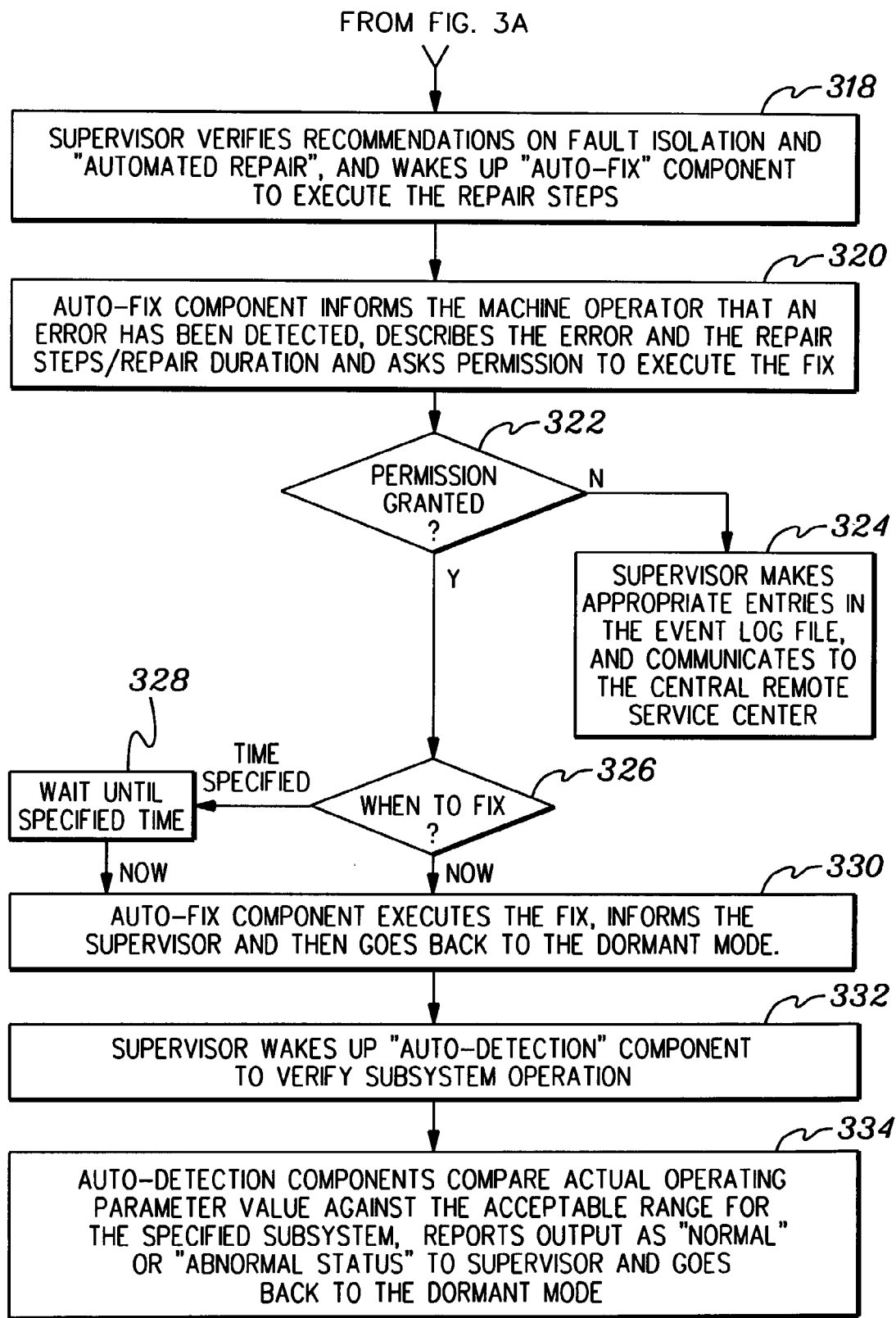
Figure 3C:
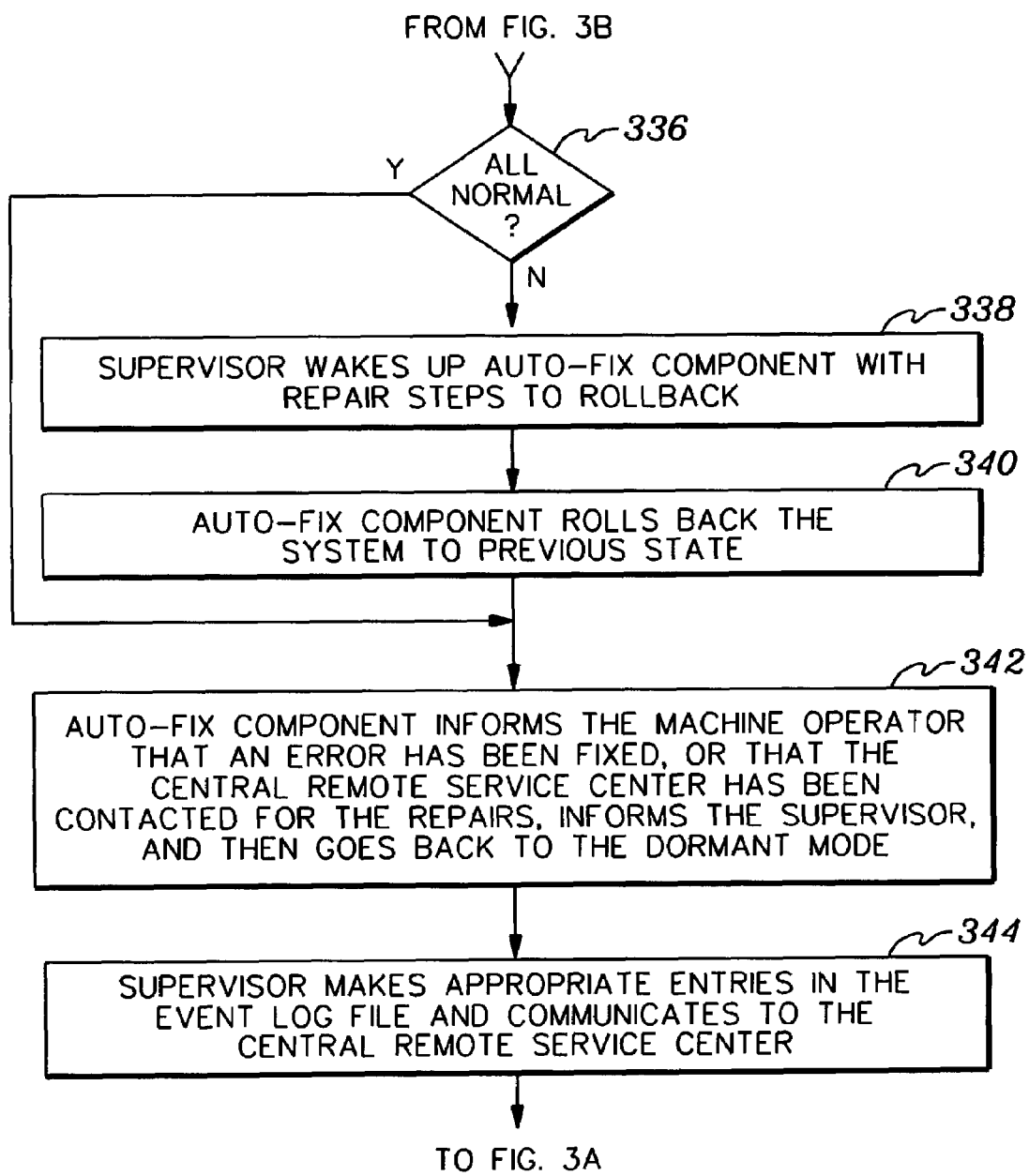

FIGS. 3A, 3B & 3C depict a more detailed process example of one embodiment of the operations of a self-diagnosing and self-healing facility in accordance with an aspect of the present invention. Those skilled in the art will note that the processes disclosed herein can be readily implemented as software modules or components for a particular application based on the description provided herein. Further, it should be noted that one or more of the steps depicted in the example of FIGS. 3A, 3B & 3C may be omitted, depending upon the particular application of the facility.

Beginning with FIG. 3A, the facility starts 300 with a supervisory component continuously monitoring selected subsystem operations by periodically and continuously waking up one or more auto-detection component(s) assigned to the subsystem(s) of interest 302. The auto-detection component(s) compares one or more actual parameter values against acceptable ranges for the respective parameters, and reports output as, for example, "normal" or "abnormal" to the supervisory component, before going back to a dormant mode 304. When an abnormal report is issued to the supervisory component, the auto-detection component(s) has detected an abnormal status of one or more operational parameters of the automated system.

The supervisory component determines whether all reports issued by the auto-detection component(s) are normal 306, and if "yes", returns to periodically monitoring the selected subsystem operations at some defined interval 302. Assuming that the supervisory component receives one or more alert messages, then the supervisory component wakes up a fault-isolation component(s), and re-directs all "abnormal status" messages and associated subsystem information to the auto-fault isolation component 308. The isolation component analyzes the alert messages, and performs various tests, before returning to a dormant mode 310. These tests include determining whether more data is needed to isolate a fault 312. If so, then the supervisory component continues to monitor the selected subsystem operations 302. If sufficient data is available to isolate a fault, then the isolation component determines whether the fault type is suitable for automated repair, including determining whether the level of diagnostic confidence is above a defined threshold, and ascertaining the quality of the repair steps available 314. If the fault type is unsuitable for automated repair, the supervisory component makes an appropriate entry in an event log file, and communicates to a central remote service center for dispatching of a field engineer 316.

Assuming that the fault type is suitable for automated repair, then as shown in FIG. 3B, the supervisory component verifies the recommendations on the fault isolation and automated repair, and wakes up the auto-fix component to execute the repair steps 318. The auto-fix component informs the machine operator that an error has been detected, describes the error and repair steps, including repair duration, and asks permission to execute the repair 320. The auto-fix component determines whether permission is granted 322, and if "not", then the supervisory component makes an appropriate entry in the event log file, and communicates to the central remote service center that permission to perform the repair has been denied 324. Assuming that permission is granted, then the auto-fix component determines when to undertake the automated repair 326. If a time is specified by the machine operator, the auto-fix component waits until the specified time 328. Otherwise, the automated repair is executed by the auto-fix component, and the supervisory component is informed of the auto repair, before the auto-fix component goes back to a dormant mode 330. The supervisory component then wakes up one or more auto-detection components to verify the subsystem operation 332. The auto-detection components compare an actual operating parameter value against the acceptable ranges for the specified subsystem, and reports output as normal or abnormal to the supervisory component 334.

As shown in FIG. 3C, the supervisory component then determines whether all responses back from the auto-detection component are normal 336. If "no", the supervisory component wakes up the auto-fix component, which has certain steps to rollback the automated repair 338. The auto-fix component then rolls back the system to its previous state 340.

The auto-fix component informs the machine operator that an error has been fixed, or that the central remote service center has been contacted for the repair, informs the supervisory component of such, and then goes back to the dormant mode 342. The supervisory component makes the appropriate entries in the event log file, and communicates to the central service center 344 before continuing with the monitoring process 302 (FIG. 3A).

A detailed illustration of the self-healing facility depicted in FIGS. 3A–3C, applied to detect and eliminate configuration errors in a magnetic resonance (MR) machine, is presented below.

A typical MR machine has several types of coils (e.g., body coil, head coil, etc.) which are required for imaging of a patient. Correct configuration parameters are required to be set for these coils to achieve a high-quality radiographic image of the patient. Typically, these coil configuration parameters are checked at every boot-up of the machine, and every time a new coil is added. Human actions are required to resolve any discrepancies between the actual configuration parameters and the desired range. Auto correction of configuration errors is possible using the self-healing facility of the present invention. In order to apply a self-healing approach, the MR expert generates a software module, called system health check, which includes expected (or desired) values for each coil type. This software is imbedded in a "detect_config" script which can be readily assembled by one of ordinary skill in the art. When this script is executed, it compares an actual value with an expected value for each coil, and determines the pass or fail status of each coil.

The sequence of steps for one embodiment of a self-healing facility in accordance with an aspect of the present invention are as follows:

(I) Supervisor: The supervisory component auto-detects the following two situations:
   (a) When the scanner goes through a boot up.
   (b) When an engineer adds a new coil. Since the addition of a coil is accompanied by an entry in the Configuration File, the date stamp is used to automatically detect this event.

Assuming one of the above events is detected, the Supervisor issues a wake-up command to the normally-dormant "Auto-Detection Component".

(II) Auto-Detection Component:
   1. Wakes up on command from the Supervisor.
   2. Executes "Detect_Config" script; the output is either "Normal" (i.e., no fault reported in the Configuration Script output file) or "Alert" (one or more specific faults are reported in the Configuration Script output file).
   3. The output (Alert) is reported to the Supervisor, and then the component goes back to the dormant mode.

(III) Supervisor:
   1. An "Alert" message is received from the Auto-Detection Component.
   2. The Supervisor issues a wake up command to the "Auto-Fault Isolation" Component.

(IV) Auto-Fault Isolation Component:
   1. Wakes up on command from the Supervisor.
   2. Checks the Configuration Script output file for the recommended values of the suspect coil parameters.
   3. Since the Configuration Script does accurate fault isolation in this case, no further fault isolation is required. Also, since the recommended value is available from the Configuration Script, the "fix" steps are already available and known.
   4. The "fix" steps are reported to the Supervisor, and the isolation component goes back to the dormant mode.

(V) Supervisor:
   1. The "fix" message is received from the Auto-Fault Isolation Component.

2. The Supervisor issues a wake up command to the "Auto-Fix" Component.

(VI) Auto-Fix Component:
1. Wakes up on command from the Supervisor.
2. Informs the machine operator (Technician) of the error detected and the recommended fix steps, and seeks permission to execute the fix.
3. The operator may choose to override the fix request, or specify the time for executing the fix.
4. If not over-ridden, the component executes the fix at the specified time.
5. The component informs the Supervisor at the conclusion of the fix (or the override decision by the operator), and then goes back to the dormant mode.

(VII) Supervisor:
1. The "Fix" completion message is received from the Auto-Fix Component.
2. The Supervisor issues a wake up command to the "AutoDetection" Component.

(VIII) Auto-Detection Component:
1. Wakes up on command from the Supervisor.
2. Executes "Detect_Config" script; the output is either "Normal" (i.e., no fault reported in the Configuration Script output file) or "Alert" (one or more specific faults are reported in the Configuration Script output file).
3. If the Fix was executed correctly, the output will be Normal.
4. The output (Normal) is reported to the Supervisor, and then the component goes back to the dormant mode.

(IX) Supervisor:
1. The "Normal" message is received from the Auto-Detection Component.
2. Makes appropriate entries in the event log file, and communicates to the central remote service center.
3. Issues a wake up command to the "Auto-Fix" Component.

(X) Auto-Fix Component:
1. Wakes up on command from the Supervisor.
2. Informs the machine operator (Technician) of successful completion of the fix.
3. The component informs the Supervisor of the operator communication, and then goes back to the dormant mode.

The self-diagnose and self-help facility of the above application example can be applied to a large number of reactive and proactive service situations. For example, the facility can be employed reactively in configuration management, application run-time management (process, database restart), dependency management (restarting related processes in order), system/subsystem reset (including peripherals), and computed files, disks, and database repair. Proactively, the self-healing facility could be employed as a trending system for incipient failures (e.g., gain management), monitoring system operating conditions (e.g., ambient temperature monitoring), and automatic downloading of software releases/patches. Also, note that while the overall self-diagnose and self-healing facility can be employed in a large variety of applications, certain applications may utilize fewer than all of the components. For example, proactive fixes/alerts and elimination of planned maintenance tasks may not require customer input.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A self-diagnose and self-repair method for facilitating operation of an automated system, the method comprising:
monitoring at least one operational parameter of the automated system;
automatically detecting an abnormal status of the at least one operational parameter;
automatically evaluating the abnormal status of the at least one operational parameter to isolate a possible fault resulting in the abnormal status;
undertaking automated repair of the possible fault, and thereafter, automatically determining whether the abnormal status has been eliminated; and
wherein the monitoring, automatically detecting, automatically evaluating and undertaking automated repair are implemented by autonomous components, including at least one auto-detection component, an auto-fault isolation component, and an auto-fix component, each of which is selectively invoked by a supervisory component as needed for a particular self-diagnose or self-repair of the automated system, and wherein the monitoring and the automatically detecting are performed by the at least one auto-detection component upon being invoked by the supervisory component, the automatically evaluating is performed by the auto-fault isolation component upon being invoked by the supervisory component and the undertaking automated repair is performed by the auto-fix component upon being invoked by the supervisory component.

2. The method of claim 1, wherein the automatically evaluating includes determining a confidence level that the possible fault resulted in the abnormal status, and proceeding with the undertaking of the automated repair of the possible fault when the confidence level exceeds a defined threshold.

3. The method of claim 2, further comprising scheduling the repair, including obtaining operator authorization to proceed with the undertaking of the automated repair of the possible fault when the automated system is in use.

4. The method of claim 3, wherein the scheduling further comprises informing the operator that the abnormal status has been detected within the automated system, and providing the operator with a description of the abnormal status, the repair steps needed to correct the possible fault, and the anticipated length of the repair operation.

5. The method of claim 1, further comprising, subsequent to the undertaking, automatically rolling back the repair of the possible fault upon determining that the abnormal status remains.

6. The method of claim 1, wherein the monitoring comprises continuously periodically monitoring the at least one operational parameter of the automated system and automatically determining whether at least one current operating value of the at least one operational parameter is outside of a normal operating range.

7. The method of claim 1, wherein the monitoring, the automatically detecting, and the automatically evaluating occur in real time without operator intervention.

8. The method of claim 1, wherein the automatically evaluating includes automatically determining whether the possible fault is of a type suitable for automated repair, and if so, proceeding with the undertaking of the automated repair.

9. The method of claim 8, further comprising automatically communicating the abnormal status to a central remote service center for scheduling of repair when the fault type is unsuitable for automated repair or the automated repair fails to remove the abnormal status, wherein the automatic communication to the central remote service center occurs without requiring action of an operator of the automated system, and automatically recording an entry in an event log file, associated with the automated system, of the abnormal status of the at least one operational parameter.

10. A self-diagnose and self-repair method for facilitating operation of an automated system, the method comprising:
   invoking from a supervisory component at least one auto-detection component for continuous, periodic monitoring of at least one operational parameter of the automated system and for periodically communicating to the supervisory component a normal status or an abnormal status condition of the at least one operational parameter;
   responsive to receipt of an abnormal status condition at the supervisory component from the at least one auto-detection component, invoking by the supervisory component an auto-fault isolation component, wherein the auto-fault isolation component automatically evaluates the status of the at least one operational parameter to isolate a possible fault resulting in the abnormal status;
   dependant on the possible fault resulting in the abnormal status, invoking from the supervisory component an auto-fix component to undertake automated repair of the possible fault, and thereafter, automatically determining whether the abnormal status has been eliminated; and
   wherein the supervisory component selectively invokes the at least one auto-detection component, the auto-fault isolation component or the auto-fix component as needed for a particular self-diagnose or self-repair of the automated system, and wherein once invoked by the supervisory component, the at least one auto-detection component, the auto-fault isolation component and the auto-fix component execute autonomously.

11. The method of claim 10, wherein the at least one auto-detection component determines whether at least one current operating value of the at least one operational parameter is outside of a normal operating range, and if so, issues the abnormal status condition to the supervisory component.

12. The method of claim 10, wherein the auto-fault isolation component determines whether the possible fault is of a type suitable for automated repair, and if not, the method further comprises automatically communicating the abnormal status to a central remote service center for scheduling of repair, wherein the automatically communicating to the central remote service center occurs without requiring action of an operator of the automated system, and automatically recording an entry in an event log file corresponding to the abnormal status of the at least one operational parameter.

13. The method of claim 10, wherein the auto-fix component informs an operator of the automated system that the abnormal status has been detected, and provides the operator with a description of the abnormal status, the repair steps needed to correct the possible fault, and the anticipated length of the repair operation, and wherein the method further comprises obtaining operator authorization to proceed with the automated repair of the possible fault when the automated system is in use.

14. The method of claim 10, wherein the automatically determining whether the abnormal status has been eliminated comprises the supervisory component invoking the at least one auto-detection component to verify that the at least one operational parameter has a normal status.

15. The method of claim 14, wherein the supervisory component wakes up the auto-fix component to rollback the automated repair and return the automated system to its previous state if the abnormal status condition remains after the automated repair.

16. The method of claim 10, further comprising automatically informing an operator of the automated system that the abnormal status has been detected and corrected, or that a central remote service center has been contacted for repair of the automated system.

17. A self-diagnose and self-repair system for facilitating operation of an automated system, the system comprising:
   monitor means for monitoring at least one operational parameter of the automated system for automatically detecting an abnormal status of the at least one operational parameter;
   fault isolation means for automatically evaluating the abnormal status of the at least one operational parameter to isolate a possible fault resulting in the abnormal status;
   repair means for undertaking automated repair of the possible fault, and thereafter, for automatically determining whether the abnormal status has been eliminated; and
   wherein the monitor means, fault isolation means and repair means are implemented as autonomous components, including at least one auto-detection component, an auto-fault isolation component, and an auto-fix component, each of which is selectively invoked by a supervisory component as need for a particular self-diagnose or self-repair of the automated system, and wherein the at least one auto-detection component comprises the monitor means and performs the monitoring and the automatically detecting upon being invoked by the supervisory component, the auto-fault isolation component comprises the fault isolation means and performs the automatically evaluating upon being invoked by the supervisory component, and the auto-fix component comprises the repair means and performs undertaking of the automated repair upon being invoked by the supervisory component.

18. The system of claim 17, wherein the fault isolation means includes means for determining a confidence level that the possible fault resulted in the abnormal status, and wherein the repair means proceeds with the undertaking of the automated repair of the possible fault when the confidence level exceeds a defined threshold.

19. The system of claim 18, wherein the repair means further comprises means for scheduling the repair, including obtaining operator authorization to proceed with the undertaking of the automated repair of the possible fault when the automated system is in use.

20. The system of claim 19, wherein the means for scheduling further comprises means for informing the operator that the abnormal status has been detected within the automated system, and for providing the operator with a description of the abnormal status, the repair steps needed to correct the possible fault, and the anticipated length of the repair operation.

21. The system of claim 17, further comprising, subsequent to the undertaking, means for automatically rolling back the repair of the possible fault upon determining that the abnormal status remains.

22. The system of claim 17, wherein the monitor means comprises means for continuously periodically monitoring the at least one operational parameter of the automated system and for automatically determining whether at least one current operating value of the at least one operational parameter is outside of a normal operating range.

23. The system of claim 17, wherein the monitor means and fault isolation means perform in real time without operator intervention.

24. The system of claim 17, wherein the fault isolation means includes means for automatically determining whether the possible fault is of a type suitable for automated repair, and if so, for proceeding with the undertaking of the automated repair.

25. The system of claim 24, further comprising communication means for automatically communicating the abnormal status to a central remote service center for scheduling of repair when the fault type is unsuitable for automated repair or the automated repair fails to remove the abnormal status, wherein the automatic communication to the central remote service center occurs without requiring action of an operator of the automated system, and for automatically recording an entry in an event log file, associated with the automated system, of the abnormal status of the at least one operational parameter.

26. A self-diagnose and self-repair system for facilitating operation of an automated system, the system comprising:
 a supervisory component supervising the self-diagnosis and self-repair of the automated system;
 an auto-detection component, invoked by the supervisory component, for continuous, periodic monitoring at least one operational parameter of the automated system and for periodically communicating to the supervisory component a normal status or an abnormal status condition of the at least one operational parameter;
 an auto-fault isolation component, invoked by the supervisory component responsive to the supervisory component receiving an abnormal status condition from the at least one auto-detection component, the auto-fault isolation component evaluating the status of the at least one operational parameter to isolate a possible fault resulting in the abnormal status;
 an auto-fix component, invoked by the supervisory component dependent on the possible fault resulting in the abnormal status, to undertake automated repair of the possible fault; and
 wherein the supervisory component selectively invokes the auto-detection component, the auto-fault isolation component or the auto-fix component as need for a particular self-diagnose or self-repair of the automated system, and wherein once invoked by the supervisory component, the auto-detection component, the auto-fault isolation component and the auto-fix component execute autonomously, and wherein the supervisory component further automatically determines whether the abnormal status has been eliminated subsequent to undertaking of the automated repair.

27. The system of claim 26, wherein the at least one auto-detection component determines whether at least one current operating value of the at least one operational parameter is outside of a normal operating range, and if so, issues the abnormal status condition to the supervisory component.

28. The system of claim 26, wherein the auto-fault isolation component determines whether the possible fault is of a type suitable for automated repair, and if not, the supervisory component automatically communicates the abnormal status to a central remote service center for scheduling of repair, wherein the automatically communicating to the central remote service center occurs without requiring action of an operator of the automated system, and the supervisory component automatically records an entry in an event log file corresponding to the abnormal status of the at least one operational parameter.

29. The system of claim 26, wherein the auto-fix component informs an operator of the automated system that the abnormal status has been detected, and provides the operator with a description of the abnormal status, the repair steps needed to correct the possible fault, and the anticipated length of the repair operation, and wherein the auto-fix component obtains operator authorization to proceed with the automated repair of the possible fault when the automated system is in use.

30. The system of claim 26, wherein the automatically determining whether the abnormal status has been eliminated comprises the supervisory component invoking the at least one auto-detection component to verify that the at least one operational parameter has a normal status.

31. The system of claim 30, wherein the supervisory component wakes up the auto-fix component to rollback the automated repair and return the automated system to its previous state if the abnormal status condition remains after the automated repair.

32. The system of claim 26, wherein the supervisory component further comprises automatically informing an operator of the automated system that the abnormal status has been detected and corrected, or that a central remote service center has been contacted for repair of the automated system.

33. At least one program storage device readable by a machine, tangibly embodying at least one program of instructions executable by the machine to perform a self-diagnose and self-repair method of facilitating operation of an automated system, the method comprising:
 monitoring at least one operational parameter of the automated system;
 automatically detecting an abnormal status of the at least one operational parameter;
 automatically evaluating the abnormal status of the at least one operational parameter to isolate a possible fault resulting in the abnormal status;

undertaking automated repair of the possible fault, and thereafter, automatically determining whether the abnormal status has been eliminated; and wherein the monitoring, automatically detecting, automatically evaluating and undertaking automated repair are implemented by autonomous components, including at least one auto-detection component, an auto-fault isolation component, and an auto-fix component, each of which is selectively invoked by a supervisory component as needed for a particular self-diagnose or self-repair of the automated system, and wherein the monitoring and the automatically detecting are performed by the at least one auto-detection component upon being invoked by the supervisory component, the automatically evaluating is performed by the auto-fault isolation component upon being invoked by the supervisory component and the undertaking automated repair is performed by the auto-fix component upon being invoked by the supervisory component.

34. The at least one program storage device of claim 33, further comprising scheduling the automated repair, including obtaining operator authorization to proceed with the undertaking of the automated repair of the possible fault when the automated system is in use.

35. The at least one program storage device of claim 34, wherein the scheduling further comprises informing the operator that the abnormal status has been detected within the automated system, and providing the operator with a description of the abnormal status, the repair steps needed to correct the possible fault, and the anticipated length of the repair operation.

36. The at least one program storage device of claim 33, further comprising, subsequent to the undertaking, automatically rolling back the repair of the possible fault upon determining that the abnormal status remains.

37. The at least one program storage device of claim 33, wherein the monitoring comprises continuously periodically monitoring the at least one operational parameter of the automated system and automatically determining whether at least one current operating value of the at least one operational parameter is outside of a normal operating range.

38. The at least one program storage device of claim 33, wherein the monitoring, the automatically detecting, and the automatically evaluating occur in real time without operator intervention.

39. The at least one program storage device of claim 33, further comprising automatically communicating the abnormal status to a central remote service center for scheduling of repair when the fault type is unsuitable for automated repair or the automated repair fails to remove the abnormal status, wherein the automatic communication to the central remote service center occurs without requiring action of an operator of the automated system, and automatically recording an entry in an event log file, associated with the automated system, of the abnormal status of the at least one operational parameter.

40. At least one program storage device readable by a machine, tangibly embodying at least one program of instructions executable by the machine to perform a self-diagnose and self-repair method for facilitating operation of an automated system, the method comprising:

invoking from a supervisory component at least one auto-detection component for continuous, periodic monitoring of at least one operational parameter of the automated system and for periodically communicating to the supervisory component a normal status or an abnormal status condition of the at least one operational parameter;

responsive to receipt of an abnormal status condition at the supervisory component from the at least one auto-detection component, invoking by the supervisory component an auto-fault isolation component, wherein the auto-fault isolation component automatically evaluates the status of the at least one operational parameter to isolate a possible fault resulting in the abnormal status;

dependant on the possible fault resulting in the abnormal status, invoking from the supervisory component an auto-fix component to undertake automated repair of the possible fault, and thereafter, automatically determining whether the abnormal status has been; and wherein the supervisory component selectively invokes the at least one auto-detection component, the auto-fault isolation component or the auto-fix component as needed for a particular self-diagnose or self-repair of the automated system, and wherein once invoked by the supervisory component, the at least one auto-detection component, the auto-fault isolation component and the auto-fix component execute autonomously.

41. The at least one program storage device of claim 40, wherein the at least one at least one auto-detection component determines whether at least one current operating value of the at least one operational parameter is outside of a normal operating range, and if so, issues the abnormal status condition to the supervisory component.

42. The at least one program storage device of claim 40, wherein the auto-fix component informs an operator of the automated system that the abnormal status has been detected, and provides the operator with a description of the abnormal status, the repair steps needed to correct the possible fault, and the anticipated length of the repair operation, and wherein the method further comprises obtaining operator authorization to proceed with the automated repair of the possible fault when the automated system is in use.

43. The at least one program storage device of claim 40, wherein the supervisory component wakes up the auto-fix component to rollback the automated repair and return the automated system to its previous state if the abnormal status condition remains after the automated repair.

44. The at least one program storage device of claim 40, further comprising automatically informing an operator of the automated system that the abnormal status has been detected and corrected, or that a central remote service center has been contacted for repair of the automated system.

* * * * *